United States Patent
Ergan et al.

(10) Patent No.: US 9,183,108 B2
(45) Date of Patent: Nov. 10, 2015

(54) LOGICAL GROUPING OF PROFILE DATA

(75) Inventors: Cenk Ergan, Bellevue, WA (US); Michael C. Fanning, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/430,968

(22) Filed: Mar. 27, 2012

(65) Prior Publication Data

US 2013/0263102 A1    Oct. 3, 2013

(51) Int. Cl.
    *G06F 9/44*    (2006.01)
    *G06F 11/30*    (2006.01)
    *G06F 9/45*    (2006.01)
    *G06F 11/34*    (2006.01)
    *G06F 11/32*    (2006.01)

(52) U.S. Cl.
    CPC ............ *G06F 11/3082* (2013.01); *G06F 8/443* (2013.01); *G06F 11/323* (2013.01); *G06F 11/3495* (2013.01); *G06F 11/3409* (2013.01)

(58) Field of Classification Search
    CPC ....................................................... G06F 17/30
    USPC ......................................................... 717/158
    See application file for complete search history.

(56) References Cited

U.S. PATENT DOCUMENTS

| | | | |
|---|---|---|---|
| 5,544,359 A | | 8/1996 | Tada et al. |
| 6,650,949 B1 | | 11/2003 | Fera et al. |
| 7,293,260 B1 * | 11/2007 | Dmitriev | 717/130 |
| 7,877,734 B2 * | 1/2011 | Branda et al. | 717/130 |
| 8,789,032 B1 * | 7/2014 | Li et al. | 717/154 |
| 2003/0020739 A1 * | 1/2003 | Cohen et al. | 345/700 |
| 2007/0079288 A1 * | 4/2007 | Willwerth et al. | 717/124 |
| 2007/0294673 A1 * | 12/2007 | Guerrera et al. | 717/130 |
| 2008/0178042 A1 * | 7/2008 | Mochizuki et al. | 714/25 |
| 2009/0094294 A1 * | 4/2009 | Morris et al. | 707/202 |
| 2011/0113405 A1 * | 5/2011 | Guerrera et al. | 717/125 |
| 2011/0138366 A1 * | 6/2011 | Wintergerst et al. | 717/130 |
| 2012/0072423 A1 * | 3/2012 | Morrison et al. | 707/739 |
| 2013/0249917 A1 * | 9/2013 | Fanning et al. | 345/440 |
| 2013/0263102 A1 * | 10/2013 | Ergan et al. | 717/158 |

OTHER PUBLICATIONS

Netbeans, Tool Report: NetBeans Profiler, Java Performance Tuning (Dec. 17, 2011) retrieved from https://web.archive.org/web/20111217172951/http://www.javaperformancetuning.com/tools/netbeansprofiler/ on Dec. 28, 2014.*

Orso, et al., "Visualization of Program-Execution Data for Deployed Software", Retrieved at <<http://citeseer.ist.psu.edu/Viewdoc/download?doi=10.1.1.142.4569&rep=rep1&type=pdf>>, Proceedings of the 2003 ACM symposium on Software visualization, 2003, pp. 67-77.

(Continued)

*Primary Examiner* — Don Wong
*Assistant Examiner* — Theodore Herbert
(74) *Attorney, Agent, or Firm* — Ben Tabor; Kate Drakos; Micky Minhas

(57) ABSTRACT

Profile data can be ascribed to groups as a function of an organizational scheme that defines groups and relationships between groups. The groups can be abstractions over profile data that are meaningful for computer program analysis. Subsequently, grouped data can be disseminated, queried, and visualized in numerous ways to further aid program analysis.

20 Claims, 10 Drawing Sheets

(56) References Cited

OTHER PUBLICATIONS

Cornelissen, et al., "A Systematic Survey of Program Comprehension through Dynamic Analysis", Retrieved at <<http://ieeexplore.ieee.org/stamp/stamp.jsp?tp=&arnumber=4815280>>, Proceedings of IEEE transactions on software engineering, vol. 35, No. 5, 2009, pp. 684-702.

McGavin, et al., "Visualisations of Execution Traces (VET): An Interactive Plugin-Based Visualisation Tool", Retrieved at <<http://citeseerx.ist.psu.edu/viewdoc/download?doi=10.1.1.60.2462&rep=rep1&type=pdf>>, Proceedings of AUIC '06 of the 7th Australasian User interface conference, vol. 50, 2006, pp. 153-160.

Haran, et al., "Applying Classification Techniques to Remotely Collected Program Execution Data", Retrieved at <<http://cgis.cs.umd.edu/~aporter/Docs/C151-haran.pdf>>,Proceedings of the 10th European software engineering conference held jointly with 13th ACM SIGSOFT international symposium on Foundations of software engineering, Sep. 5-9, 2005, pp. 10.

Bowring, et al., "Monitoring Deployed Software Using Software Tomography", Retrieved at <<http://citeseerx.ist.psu.edu/Viewdoc/download?doi=10.1.1.8.7773&rep=rep1&type=pdf>>, Proceedings of the 2002 ACM SIGPLAN-SIGSOFT workshop on Program analysis for software tools and engineering, Nov. 18-19, 2002, pp. 2-9.

"Semantic Grouping for Program Performance Data Analysis", U.S. Appl. No. 12/885,714, filed Sep. 20, 2010, pp. 62.

"International Search Report", Mailed Date: Jun. 24, 2013, Application No. PCT/US2013/030308 Filed Date: Mar. 12, 2013, pp. 10.

* cited by examiner

| Line | Process | Thread ID | Category 1 | Category 2 | Category 3 | Start Time (us) | End Time (us) | Duration (ms) | %IE CPU | % Time | Count |
|---|---|---|---|---|---|---|---|---|---|---|---|
| 1 | ⊟ iexplore.exe (8568) | | | | | 3,702,135.697 | 16,085,352.193 | 2,550.750 203 | 83.21 | 20.53 | 63,264 |
| 2 | | ⊟ 5,872 | | | | 3,803,304.755 | 12,175,869.644 | 1,532.873 293 | 50.00 | 12.34 | 56,179 |
| 3 | | | ⊟ Trident | | | 5,485,561.304 | 10,702,628.671 | 779.674 450 | 53.43 | 6.28 | 11,999 |
| 4 | | | | ⊟ Layout | | 5,683,598.697 | 10,702,628.671 | 409.762 861 | 13.37 | 3.3 | 6,369 |
| 5 | | | | | ⊞ Other | 5,683,598.697 | 10,702,628.671 | 166.403 649 | 5.43 | 1.34 | 1,972 |
| 6 | | | | | ⊞ BuildBlocks | 5,683,626.856 | 10,588,711.402 | 120.643 735 | 3.94 | 0.97 | 269 |
| 7 | | | | | ⊞ BuildLayout | 5,683,712.767 | 10,588,735.539 | 96.437 889 | 3.15 | 0.78 | 393 |
| 8 | | | | | ⊞ Build Display | 5,683,783.013 | 10,699,226.491 | 26.277 588 | 0.86 | 0.21 | 3,735 |
| 9 | | | | ⊞ Display | | 5,685,046.900 | 10,702,598.317 | 211.867 740 | 6.91 | 1.71 | 749 |
| 10 | | | | ⊞ Parsing | | 5,485,561.304 | 8,284,118.075 | 111.133 766 | 3.63 | 0.89 | 1,847 |
| 11 | | | | Hover | ⊞ Other | 5,826,295.712 | 6,236,039.193 | 45.823 196 | 1.49 | 0.37 | 13 |
| 12 | | | | Security | ⊞ Anti Phishing | 5,508,513.861 | 7,227,435.916 | 1.086 887 | 0.04 | 0.01 | 21 |
| 13 | | | ⊞ JScript9 | | | 5,503,750.517 | 10,588,317.901 | 410.834 144 | 13.40 | 3.31 | 37,611 |
| 14 | | | IE-UIThread | Other | ⊞ Other | 3,803,304.755 | 12,175,869.644 | 335.987 154 | 10.69 | 2.7 | 6,176 |
| 15 | | | IEFrame | History | ⊞ Other | 5,774,598.516 | 8,287,217.208 | 6.377 580 | 0.21 | 0.05 | 393 |
| 16 | | 8,864 | IE-Process | Other | ⊞ Other | 5,941,230.014 | 15,696,257.674 | 323.230 891 | 10.54 | 2.6 | 943 |

FIG. 6

LOGICAL GROUPING OF PROFILE DATA

BACKGROUND

Profiling enables examination of program behavior to focus performance tuning. A profiler is an automated tool that produces a profile of a program from information collected during program execution. A profile captures behavioral characteristics of a program. One or more portions of program can be identified from a profile as candidates for optimization. For example, a profile might indicate that an excessive amount of time is spent executing a particular function. In other words, a profile aids understating of program behavior to allow concentration of optimization efforts. Profilers are often classified based on their methods of gathering data, among other things.

There are two distinct types of approaches to gathering profile data, namely instrumentation and sampling. In the instrumentation approach, code is added to a program to collect information during execution. Here, the added code is an instrument that measures program behavior as the program executes. For example, the frequency and duration of function calls can be measured. In the sampling approach, an executing program is halted periodically, using operating system functionality, and sampled to determine the current state of execution. Accordingly, it can be noticed that twenty-percent of the time the program is executing a specific code point, for example. The sampling approach thus provides a statistical approximation rather than exact data.

Profile data is often presented as a call tree (a.k.a., call graph) that breaks down program execution. For example, a call tree can show function execution paths that were traversed in a program. The root node of the call tree can point to the entry point into the program and each other node in the tree can identify a called function as well as performance data such as execution time of the called function. The edges between nodes can represent function calls, and cycles can be indicative of recursive calls. The call tree can be analyzed by a developer to identify program hotspots, such as functions that occupy a large portion of execution time, among other things.

SUMMARY

The following presents a simplified summary in order to provide a basic understanding of some aspects of the disclosed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the subject disclosure pertains to logical grouping of profile data. Profile data is ascribed to groups as a function of an organizational scheme that defines groups and relationships between groups. The groups can be abstractions over the profile data that are meaningful for program analysis. In other words, the groups can convey information about high-level functions of a program or sub-systems thereof (e.g., opening a document, recalculating layout, rendering a window . . . ), among other things. Context switches can also be accounted for such that profile data is precise with respect to execution time and central processor unit (CPU) utilization, for example. In addition, grouped data can be queried and visualized in various ways to further facilitate program analysis.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

BRIEF DESCRIPTION OF THE DRAWINGS

FIG. 6 is an exemplary screenshot of a table visualization of profile data.

DETAILED DESCRIPTION

Figure 1:
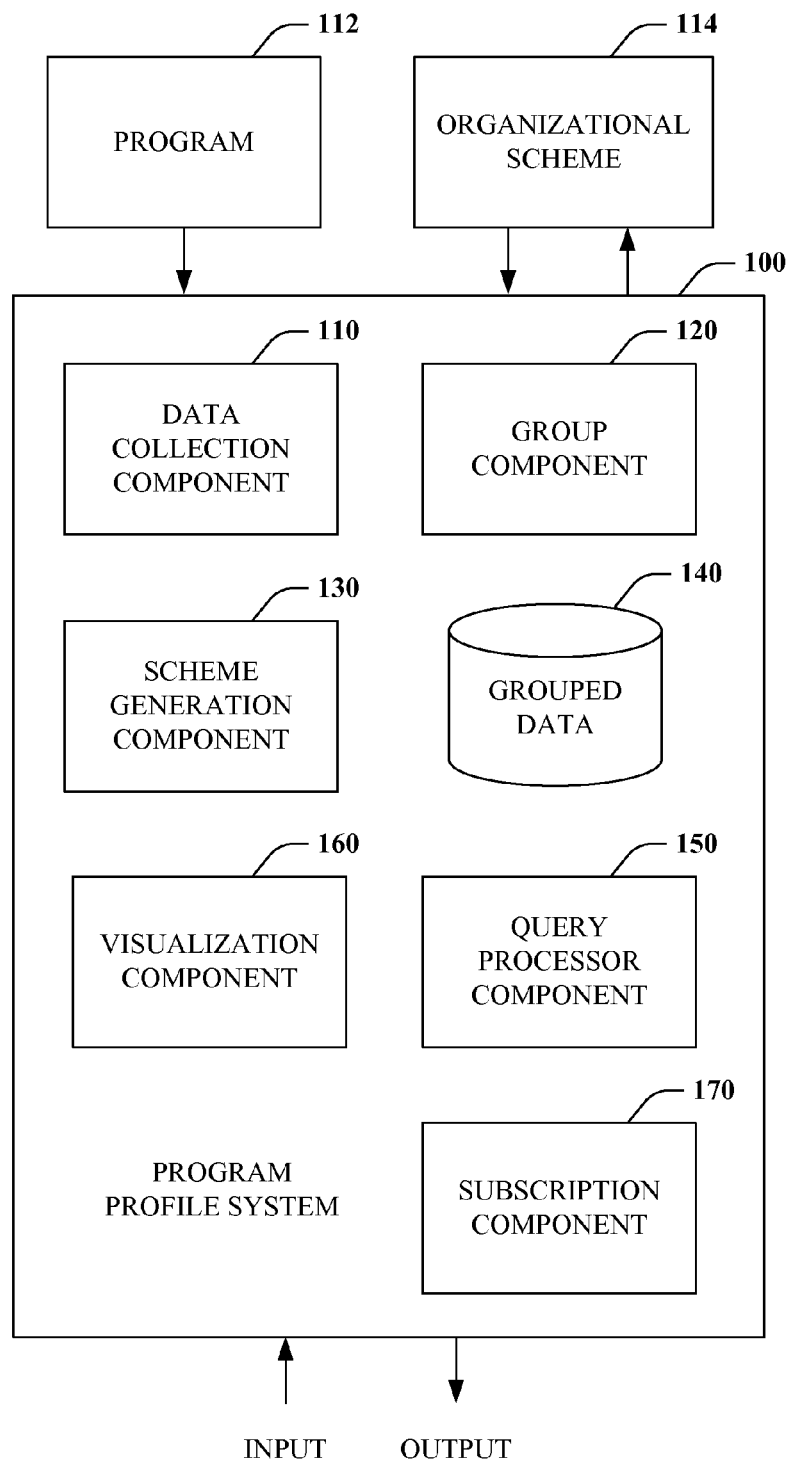
FIG. 1 is a block diagram of a program profile system.

Profile data is conventionally too copious and granular to be useful in identifying and resolving programming issues. By way of example, typical applications include thousands of functions (with names of varying readability), and hundreds of thousands of functions can be called in a single second. Obscurities can also be an issue since profiling data can be closely associated with machine and operating system details. Furthermore, modern hardware and operating systems introduce new complexities for managing data across central processing units (CPUs) and threads.

In view of the above, it is difficult to understand whether a specific function, for example, is taking an unreasonable amount of time as it can only be compared against all other functions or compared to the execution that it provokes. This latter analysis treats all calls provoked by a function as equivalent. That is, there is no way to distinguish, for example, between a call that is not under developer control, such as a supporting operating system, runtime, application framework, or library, and a call that is under developer control. This information is valuable in terms of making a fix, bearing in mind that a developer cannot influence the actual implementation of code on which it depends.

The conventional call tree view addresses the issue of multiple distinct pieces of profiling data by creating an aggregate view. However, the call tree view can also be problematic. By way of example, and not limitation, code can easily initiate asynchronous operations that when profiled have no obvious connection to the code that initiated it. If these asynchronous operations are distributed across many distinct callbacks, the aggregated cost implied by initiating code can be obscured, because no individual callback surfaces as a problem in its own right but only when aggregated with other callbacks. Thus, it is recognized that conventional profilers can aggregate data. However, such data may only be useful if it is broken down into pieces that are more meaningful. For example, the time-to-execute attributed to an asynchronous callback might be more usefully understood when broken down into the various transactions that were associated with the callback.

Stated differently, two conditions can be problematic with respect to understanding profile data. First, profiling data can be segmented into numerous and distinct pieces, where a coarser view is more useful. Second, data can be aggregated where a more granular view is helpful. For instance, consider a common handler that is associated with multiple transactions. Here, it might be helpful to break apart execution costs of hitting that handler and organizing them in some way. In another scenario, a particular operation can exercise many different callbacks. In this case, it might be useful to examine the distributed costs of the operation.

Details below are generally directed toward logical grouping of profile data. An arbitrary organizational scheme that defines groups and relationships between groups can be overlaid on profile data to enable a high-level understanding of the structure and meaning of executed code, among other things. More particularly, profile data can be ascribed to one or more groups based on an organizational scheme, where the groups are abstractions that are meaningful to human users that analyze a program. By way of example, functions can be bucketed as being related to window layout, rendering, or both. Subsequently, it can be easily determined that a program is spending an exorbitant amount of time laying out content (e.g., web/document content) based on the execution time/count associated with a layout group. Additionally, processing can account for changes in context, where one process is switched out of a central processing unit so that another process can run, for instance. Accordingly, data can be managed in a precise way at low levels such that when it is rolled up to high levels in meaningful groups the data is accurate. Subsequent to collection and processing of profile data, resulting grouped data can be disseminated, queried, and visualized in various ways to further aid program analysis.

Various aspects of the subject disclosure are now described in more detail with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

Referring initially to FIG. 1, a program profile system 100 is illustrated. Among other things, the program profile system 100 enables a top-down view of program performance based on a high-level understanding of the semantic purpose of code and/or its identity within a broader system (e.g., owned by program, subsystem of program, subsystem within dependent component . . . ), among other things such as program personnel. This can be accomplished by processing and analyzing profile data gathered by data collection component 110.

The data collection component 110 is configured to acquire profile data regarding program 112. Profile data can be any arbitrary collected and/or computed data associated with execution of a program. In one instance, such profile data can correspond to a time to execute with respect to a particular function/operation. In another instance, the profile data can correspond to non-time-to execute data including occurrence or frequency of one or more events and optionally a payload associated with the occurrence of one or more events, where an event is a signal that an executing program has hit a specific point in code, and a payload is data associated with hitting the specific point in code. By way of example, non-time-to-execute profile data can include bytes or objects allocated, page refreshes, registry reads/writes, worker threads spawned, or associated binary, among other things. The program (a.k.a. computer program) 112 comprises a set of instructions specified in a computer programming language that when executed by a processor performs actions prescribed by the set of instructions. The data collection component 110 can gather profile data from an executing program utilizing a variety of techniques including instrumentation and sampling. Work performed by the program 112 can by captured by event/execution probes (e.g., event tracing events or callbacks from instrumented code) or stack samples collected by an operating system, for example. Data can be collected that enables analysis in terms of time-to-execute (e.g., central processing unit utilization or literal cycles spent in active execution), heap allocations, or other arbitrary information that can be expressed in custom payloads of generated events.

A combination of instrumentation and sampling can be utilized by the data collection component 110. Data collected by each approach can augment the other approach. For example, data can be combined/merged, averaged, cross-checked, and/or statistically normalized, among other things. In this manner, advantages of both approaches can be exploited and disadvantages can be offset. As an example, both approaches can result in an observer effect, which means the act of observing a program itself can influence the program. Sampling typically does not result in a significant observer effect, but results in less precise data than that gathered by instrumentation. Accordingly, sampling data can be supplemented with instrumentation data, where appropriate. Additional mitigation against the observer effect can also be provided by creating profiling buckets that overtly group (and therefore exclude from other data) profiling data associated with operating system code that executes during production of events from instrumented code and stacks from code sampling. Further, a lightweight instrumentation approach can also be enabled where a stack is received with respect to instrumented probes/events. Suppose a single event is enabled solely for bytes allocated (which results in very little observer effect). If the "bytes allocated" event is associated with a stack, the bytes allocated data can be grouped according to stack-specified bucketing. Note, in this example, there is no sampling literally enabled. Hence, run-time events and/or collected stacks can be utilized to organize profile data.

Group component 120 is configured to ascribe profile data gathered utilizing the data collection component 110 to specific groups, or buckets, as a function of organizational scheme 114. In other words, profile data can be correlated and associated based on a descriptive mechanism that defines groups and relationships between groups. In one instance, groups can convey information about high-level functions of a program or sub-systems thereof (e.g., opening a document, recalculating layout, rendering a window . . . ). In furtherance of the foregoing, the group component 120 can be configured to initialize data structures based on a given organizational scheme 114 and populate groups with profile data. Other implementations are also possible including, but not limited to, tagging profiling data with group information. In any event, the result of processing performed by the group component 120 is grouped data, which can be housed in a local or remotely accessible data store 140.

The organizational scheme 114 can define groupings in terms of function names (e.g., full function name within a binary file (e.g., executable)), for example. Groups can be expressed in hierarchical relationship of parents and children. However, groups can be constructed that are mutually exclusive of one another, for example by defining them as sibling nodes. Groups can include sub-groups, also called categories, as child nodes, for example. Note, however, that unless otherwise explicitly noted, use of the term "group" or "groups" is intended to include sub-groups, or categories. Functions can be associated with groups at any level and can appear in an arbitrary number of groups. In other words, functions are not limited to being ascribed to a single group but instead can appear in multiple groups at any level of granularity. As well, function information can be used to aggregate data, for example based on stack samples and/or an instrumented/event-based collection. For example, a binary file name and the function name can be utilized as bases for grouping. This can be helpful with respect to distinguishing execution that spans multiple binary files. Groups can also define events that do not explicitly provide binary/function details, but that provide an event identifier, which is available in the collected data. Binary/function information in this case can be implied by the set of code locations that raise a specified event. In at least some operating systems, a stack will be available on generating an event to distinguish amongst multiple code locations raising the event. Further, note that a group hierarchy as provided herein can be independent of function execution paths. The reason for this is twofold. First, in the instrumented case, a notion of a stack can be employed for grouping data that is entirely decoupled from the actual execution stack. Second, in the sampling case, arbitrary unique stacks can be associated with the same group.

Priorities can also be designated for individual groups to assist in grouping data. More specifically, priority enables breaking of a default rule of organization based on the most current stack frame (e.g., literal code stack, virtual event start/stop pair stack). Such a priority value can be expressed relative to all other groups and used to assist in grouping/bucketing decisions. If data is under consideration for a group that has a lower specified priority than other candidate groups that exist to hold the data, the data can be attributed to an alternate group that has the highest explicit or implied priority. Groups defined in hierarchical relationships can have an implicit priority based on that hierarchy. If a parent "A" includes a child "B," for example, "B" is regarded as a higher priority group over "A." Accordingly, data collected with a stack "A::B" will therefore be associated with group "B." However, if group "B" is explicitly specified at a lower priority than group "A," then data will be grouped in group "A."

Profile data can be correlated in various ways to permit flexible querying at various scopes, among other things. As examples, profiling data might extend across process boundaries or across machines. In one instance, profile data can be grouped by time in accordance with timestamps. At a more granular level, the profile data can be grouped by central processing units or threads. Further, a universal activity identifier could be used to track inter-thread communication in useful ways, for instance by tracking activity associated with a multi-threaded transaction.

In one instance, the organizational scheme 114 can be embodied as a data file that can be authored, edited, and maintained out-of-band from, or independent of, other processes. Further, the organizational scheme 114 can be easily passed around. This can allow code experts to capture a useful model of analyzing profile data for a program of which they are an expert and distribute this model to non-expert users. For example, an expert in the inner workings of a web browser could generate an organizational scheme and distribute the scheme to web application developers to aid performance tuning.

In one particular implementation, the organizational scheme 114 can be expressed in XML (eXtensible Markup Language) thus providing general readability. In this implementation, and as employed with further description below, groups or subgroups are referred to as tags or tagsets, where a tag denotes a group and a tagset refers to set of groups. Examples of organizational schemes specified in XML are provided later herein.

Scheme generation component 130 is configured to facilitate generation of the organizational scheme 114. In one instance, a human user can manually author the organizational scheme 114 optionally employing pattern matching or other filtering mechanisms (e.g., regular expressions, use of wild-card characters . . . ) to aid specification. The scheme generation component 130 can enable automatic or semi-automatic (e.g., with user assistance) generation of groups, for instance based on available information including context information. By way of example, and not limitation, source control history, which stores information regarding changes made to a program, can be mined by the scheme generation component 130 and used to automatically generate groups. For instance, a "code owner" group could be created to enable profile data to be broken down by team or individual owner of code. This allows users to identify experts who could assist with a performance problem easily.

Query processor component 150 is configured to enable execution of queries over grouped data. Given a query, the query processor component 150, utilizing known or novel mechanisms, can extract and return results that satisfy the query from the data store 140. A visualization, or diagnostic tool, for example, can employ the query processor component 150 to acquire data.

Visualization component 160 is configured to enable grouped profile data to be visualized. The profile data can be rendered in an arbitrary number of ways rather than being limited to conventional call trees. Further, since profile data is grouped in a semantically meaningful level, visualizations can exploit groupings and further aid a human user in understanding profile data. In accordance with one embodiment, the visualization component 160 can spawn a graphical user interface that graphically depicts grouped profile data and enables interaction with the data. For example, a query can be authored over the grouped data by the visualization component 160 or a human user and filtered results returned as a function of the query. Further, a mechanism can be provided to allow users to drill down to acquire more detailed data as well as rollup to view data at a more abstract/high-level.

While the program profile system 100 includes a visualization component 160, it should be appreciated that visualization or diagnostic tools can be external to the program profile system. In this scenario, interaction can be accomplished in a similar manner, for example by querying the profile system for requisite data. Furthermore, note that the visualization component 160 can be extendable in various ways. For example, initially the visualization component 160 can support a first set of visualizations. Subsequently, a second set of visualizations can be added by way of a third-party plugin or through an update/upgrade to the program profile system 100, for instance.

Subscription component 170 provides an additional or alternate manner of disseminating grouped data. More specifically, grouped data housed in data store 140 can be delivered in accordance with a publish/subscribe model. The subscription component 170 can offer and manage subscriptions and publish the grouped data to interested subscribers.

The program profile system 100 is not limited to operating with respect to real-time execution of a program, or, stated differently, as profile data is collected. Additionally, the program profile system 100 can operate with respect to historical data, or at a time post-collection. For example, an arbitrary organizational scheme can be overlaid on a persisted log to enable data to be viewed at a meaningful level in terms of program function and structure. In other words, an arbitrary number of views can be raised against trace data by applying alternate groupings.

Figure 2:
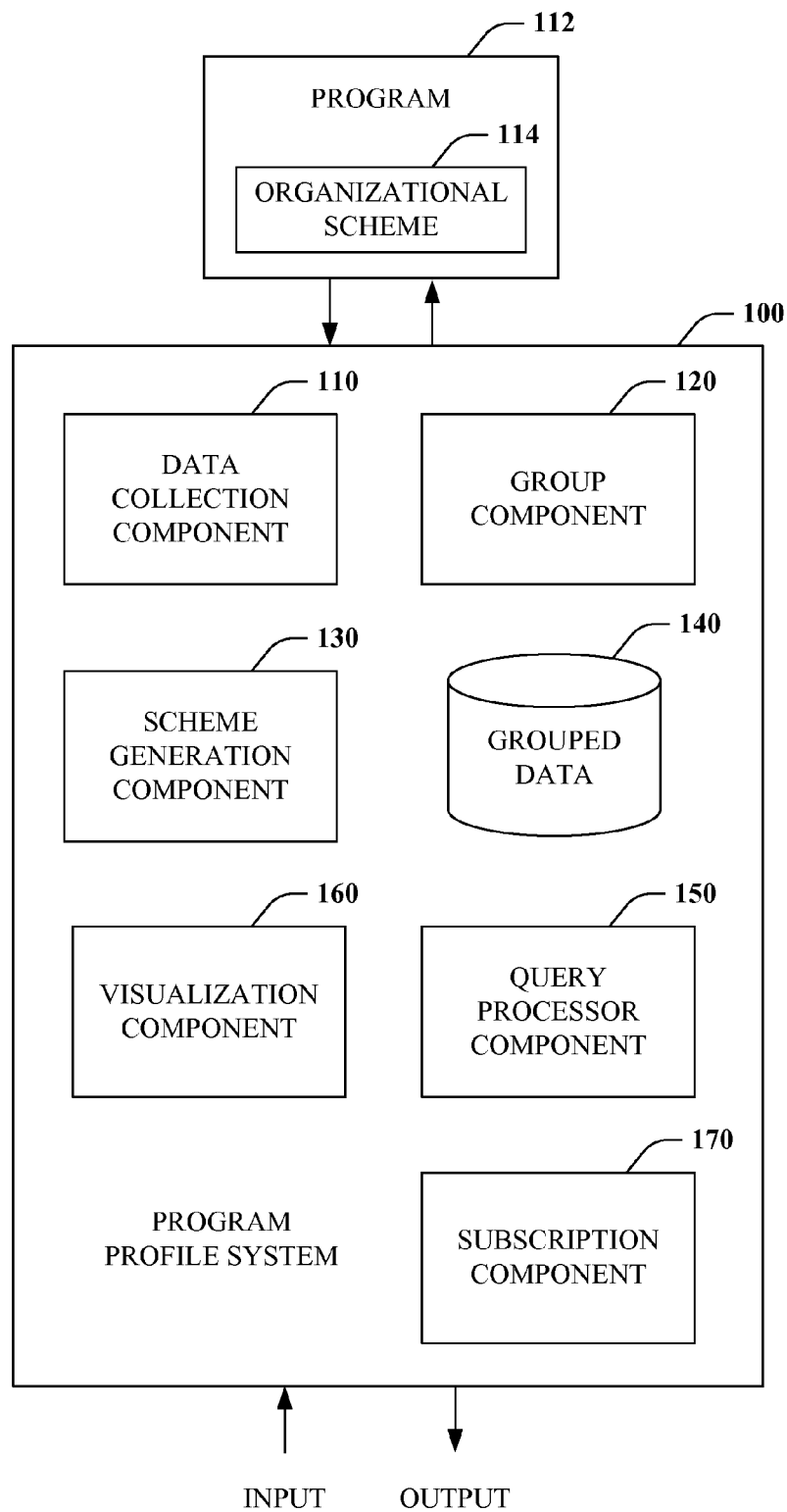
FIG. 2 is a block diagram of a program profile system.

As shown in FIG. 1, the organizational scheme 114 can be external to not only the program profile system 100 but also the program 112. This has many benefits including, among others, portability and allowing the organizational scheme to be changed easily. However, the disclosed subject matter is not limited thereto. In an alternate embodiment, the organizational scheme 114 can be embedded with the program 112, or a version thereof, as shown in FIG. 2. For example, the organizational scheme can be encoded in such a manner that the information is provided with profile data such as part of an instrumentation event. More specifically, the organizational scheme can be encoded in program function names. Additionally or alternatively, a string identifier indicative of a group or sub-group can be associated with a function or other portion of a program and raised with an event.

Still further yet, rather than encoding the organizational scheme 114 in the program 112, a process for generating the organizational scheme 114 can be encoded in the program 112. The scheme generation component 130 can then automatically generate the organizational scheme 114 based on the encoded process, for instance at runtime. As an example, at runtime, an arbitrary grouping can be created by binary name, such that all profile data collected during execution of a first binary is ascribed to the first binary and all profile data collected when a second binary is executed is ascribed to the second binary. Additionally, the scheme generation component 130 can be configured to automatically update the organizational scheme 114 in real-time, for example as data is being collected or as part of dynamically regenerating a new view on a collected log.

Figure 3:
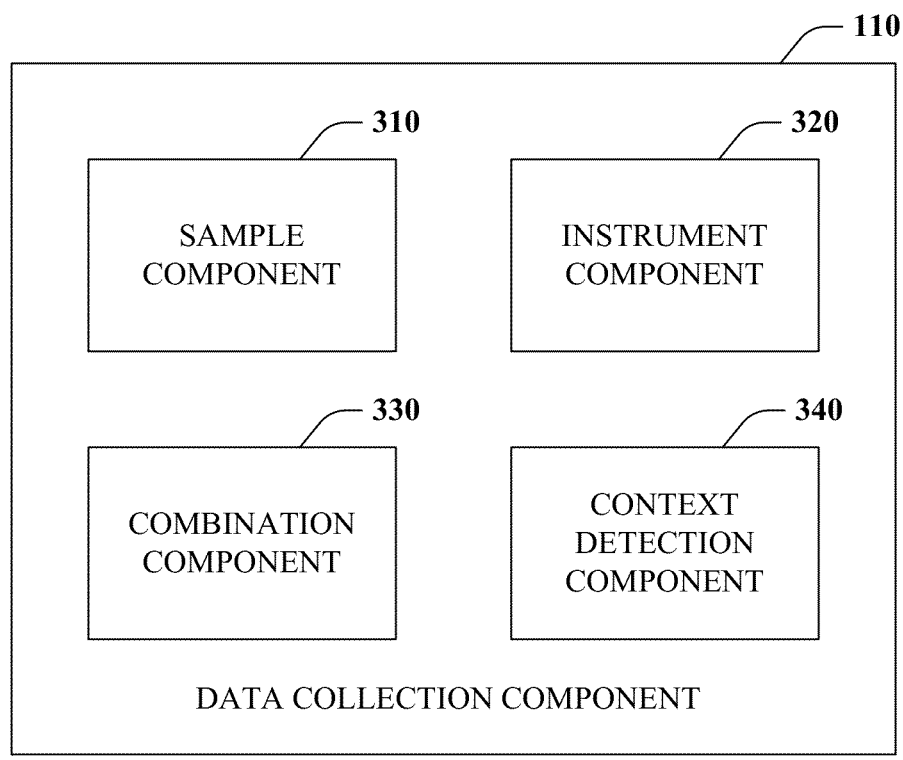
FIG. 3 is block diagram of a representative-data collection component.

FIG. 3 depicts a representative data-collection component 110. As previously described, the data collection component 110 is configured to acquire profiling data from a program that can subsequently be grouped as a function of an organizational scheme. The data collection component 110 includes a sample component 310 and an instrument component 320. The sample component 310 is configured to initiate sampling of a program during execution, for example by making appropriate calls to an operating system and acquiring the results. In one instance, a sample is a stack that is collected at a specific moment in time (either as a result of a specific code operation, such as an allocation event, or as part of an organized collection processes from which a general picture of code execution will be created). The instrument component 320 is configured to receive, retrieve or otherwise obtain or acquire data resulting from program instrumentation. Here, data can be probe data, effectively a start/stop pair of events, for example. In one instance, start/stop events are employed to acquire a payload. In other instances, the start stop events can be utilized to demarcate an interesting boundary (no explicit payload). A time stamp and call stack can be acquired for any generated event. Accordingly, an event can be said to implicitly carry those payloads as well. A sample can be thought of as the system forcing a "code is executing" event with a time stamp and current call stack payload. Further, note that events can be marked with an activity identifier that can flow across various contexts, such as threads, into other events. This data can be used, therefore, to correlate profile data in a flexible manner.

Combination component 330 is configured to enable use of both instrumentation and sampling in various manners. For instance, data collected by each approach can augment the other approach. More specifically, data can be combined, utilized to cross check results, and/or statistically normalized, among other things. In this manner, advantages of both approached can be exploited and disadvantages can be mitigated. By way of example and not limitation, inherently less precise sample data can be supplemented with more precise instrumentation data.

Context detection component 340 is configured to detect a context switch or in other words, a change in processing context. For example, a context switch can occur with regard to multiple processes sharing a CPU. In such a multitasking environment, a process can be halted and the state of a CPU stored such that the process can be resumed from the same point at a later time. Stated differently, one process is switched out of a central processing unit so that another process can run. In one instance, a context switch can be considered a special type of event. Once a context switch is detected with respect to a program being profiled, data collection can be suspended until processing resumes or collected data can be marked such that the program profile system 100 can differentiate data associated with a program from data that is not. In this manner, data can be excluded. For example, duration of function calls, of time-to-execute, can exclude time spent executing processes unrelated to a program being profiled, or in other words periods of inactivity with respect to a program being profiled due to a context switch.

Figure 4:
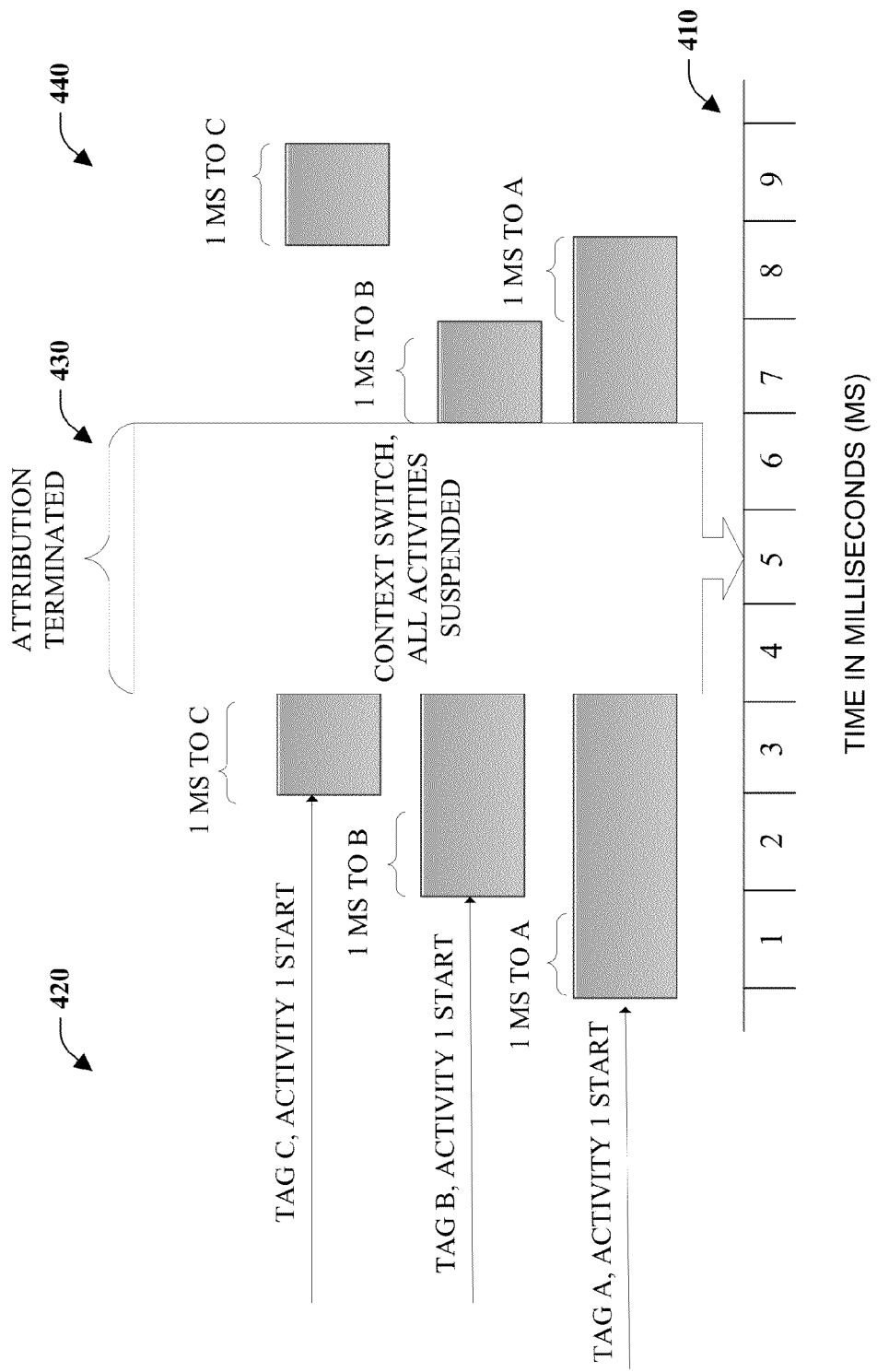
FIG. 4 illustrates data collection for start/stop event pairs.

Consider the following organizational scheme authored in XML in conjunction with FIG. 4, in which tags identify groups.

```
<?xml version="1.0" encoding="utf-8"?>
<TagSet Name="ExampleTagSet">
  <Tag Name="A">
    <Events>
      <EventStart Provider="ExampleProvider" Symbol="A_Activity1_START"/>
      <EventStop Provider="ExampleProvider" Symbol="A_Activity1_STOP"/>
    </Events>
    <Tag Name="B">
      <Events>
        <EventStart Provider="ExampleProvider" Symbol="B_Activity1_START"/>
        <EventStop Provider="ExampleProvider" Symbol="B_Activity1_STOP"/>
      </Events>
      <Tag Name="C">
        <Events>
          <EventStart Provider="ExampleProvider" Symbol="C_Activity1_START"/>
          <EventStop Provider="ExampleProvider" Symbol="C_Activity1_STOP"/>
        </Events>
      </Tag>
    </Tag>
  </Tag>
</TagSet>
```

This organizational scheme concerns an instrumented approach to data collection including a plurality of start/stop event pairs for three arbitrary groups (a.k.a. tags) "A," "B," and "C." FIG. 6 shows an event stream timeline 410 of nine milliseconds, which is a level of granularity chosen solely for illustrative purposes. In this timeline 410, an event associated with group/tag "A" starts, as indicated in the organizational scheme as "A_Activity1_START." During execution and prior to the an exit event associated with tag "A," an event associated with group/tag "B" fires, noted as "B_Activity1_START." An event pertaining to group/tag "C"

("C_Activity1_START) occurs at millisecond three while "A" and "B" are in progress, and an exit event ("C_Activity1_STOP") occurs before millisecond four. At millisecond four, a context switch occurs and this particular line of activity is suspended. As indicated, no execution data will be attributed during milliseconds four, five, and six. At millisecond seven, tag "B" finishes execution, and at millisecond eight, tag "A" finishes. At millisecond nine, a start/stop pair for tag "C" occurs. Because neither tag "A" nor tag "B" is in progress, this time unit is added to tag "C." Accordingly, there is time 420 before the context switch, time 430 during the context switch and time 440 after the context switch. During time 410, one millisecond is attributed to each of group/tag "A," "B," and "C." During time 430, no time is attributed to any group. During time 430, one millisecond is attributed to each of group/tag "A," "B," and "C."

The following is a similar scenario except that sampling is the data collection mechanism rather than instrumentation. Consider the following organizational scheme specified in XML in conjunction with FIG. 5, in which tags identify groups and the structure defines hierarchical relationships between groups.

```
<?xml version="1.0" encoding="utf-8"?>
<TagSet Name="ExampleTagSet">
   <Tag Name="A">
      <Entrypoint Module="BinaryOne.dll" Method="ClassOne::A"/>
      <Tag Name="B">
         <Entrypoint Module="BinaryOne.dll" Method="ClassOne::B"/>
         <Tag Name="C">
            <Entrypoint Module="BinaryTwo.dll" Method="HelperClass::C"/>
         </Tag>
      </Tag>
   </Tag>
</TagSet>
```

Figure 5:
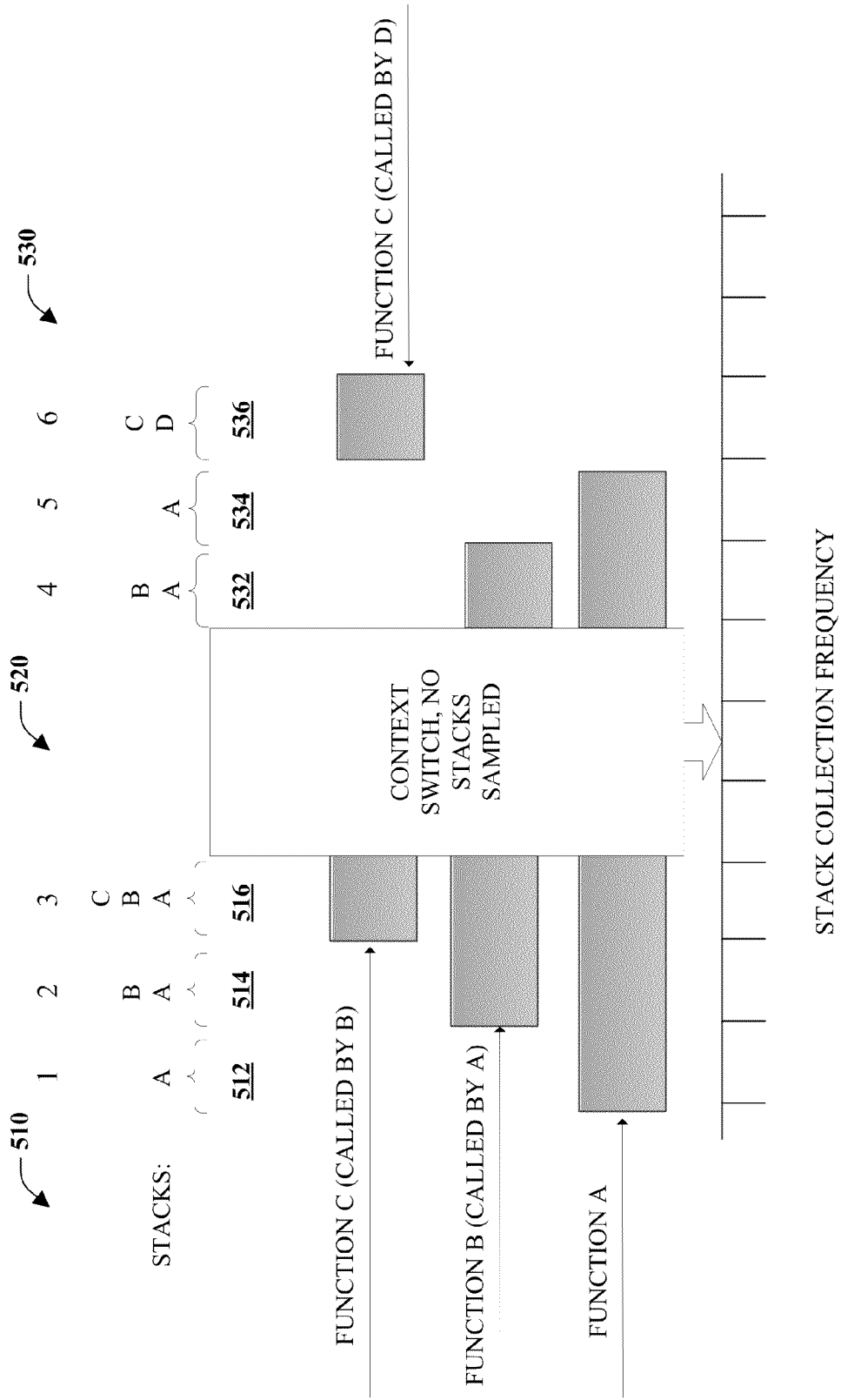
FIG. 5 illustrates data collection for stack samples.

Here, the organizational scheme is defined for groupings of stack samples. As shown in FIG. 5, six stacks are collected, three during time 510 before a context switch, zero during time 520 corresponding to the context switch, and three during time 530 after the context switch. In the first sample 512, solely function "A" is executing. In the second sample 514, function "B" has been called by function "A" resulting of a stack of "A" and "B" (A::B). As defined by the organizational scheme, time associated with this code stack is attributable to "B." In the third sample 516, function "C" has been called by function "B" which was called by function "A" resulting in a stack of "A," "B," and "C." In accordance with the organizational scheme, time for this code stack is attributed to "C." There are no samples collected during time 520 due to the context switch. In the fourth sample 532, solely functions "A" and "B" remain in execution resulting in a stack of "A" and "B" (A::B), and time is attributed to "B." In the fifth sample 534, the code stack includes solely function "A" consequently resulting in time being attributed to "A." Next, in sample six 536, function "C" is called by function "D" resulting in a stack of "D" and "C" (D::C). In this case, "C" is the closest frame associated with a defined group and it is therefore added to group/tag "C." Note that neither "A" nor "B" is required to be on the stack in order to provide this bucketing as might be assumed strictly on the basis of examining the hierarchical XML.

FIG. 5 is also helpful for clarifying the role of priority in the system. Imagine that group "C" has been given a lower priority than "A" or "B" (countermanding an implied priority established by the fact that children are, in the absence of any other explicit mark, higher in priority than parents). In this scenario, the third collected stack "A::B::C" would actually be attributed to group "B," as the highest priority group in the analyzed stack. The sixth collected stack "D::C" would still be ascribed to group "C," as described above.

Note also that an organizational scheme, such as the previous organizational scheme, can employ wild cards and/or pattern matching with respect to symbol/event names. Consider, for example, use of a star wildcard character as in "module='*' method='malloc'". Here, an allocation routine will be called across all modules. As another example consider "method='ClassOne::*'". In this case, all members of "ClassOne" are identified.

Returning to FIG. 3, additional details are provided about how instrumentation and sampling can be employed with respect to grouping. The instrumentation approach utilizes a number of event start/stop pairs to demarcate a meaningful boundary and separate profile data. In this scenario, an event is a signal that an executing program has hit a specific point in code. Here, there is a pair of events associated with start and stop. For example, a start event can indicate that page rendering has begun and a stop event can indicate that the page rendering has terminated. Further, suppose there is an arbitrary group "A" that is to include data associated with event "B" and event "C." When event "B" and event "C" start and stop, intervening execution time can be aggregated and ascribed to group "A." The intervals specified with start stop pairs can thus be coalesced into a logical group "A." In other words, a number of events can be utilized to demarcate boundaries for groupings. Further, note that events can be associated with non-time-to-execute profile data including bytes or object allocated, page refreshes, registry reads/writes, and threads spawned, among other things. Accordingly, an event can indicate that "X" bytes were allocated, for example.

As per sampling approach, rather than having event start/stop pairs, a sampled stack and timestamp are employed. Groups can be defined with respect to one or more particular stacks. In other words, a subset of stacks is mapped to one or more logical groups. In the instrumentation approach, it is known when an event such as "C" fires. However, there is also a stack corresponding event "C" firing. Additionally, event "C" may be fired from multiple places, so there can many different stacks that can be attributed to group "A." For example, it can be indicated that stack "A::B::C" and stack "X::Y::C" are indicative of event "C" and maps to group "A" but stack "D::E::C" does not. In other words, empiric code conditions are detected that indicate that event "C" might have fired and as such associated profile data should be ascribed to logical group "A." With instrumentation, it is possible to determine precisely what is happening in a program, whereas sampling is an approximation. Sampling essentially indicates that a certain percentage of the time when the program was checked profiling data was ascribed to logical group A.

When working with event start/stop pairs, these pairs lead to logical groupings and allow ascription of associated profile data and aggregation of intervening data points without consulting a stack. For example, when an event such as rendering starts, bytes are allocated, and subsequently the rendering event stops, the bytes allocated are ascribed to group "A," for example. There is no need to consult a stack. However, if event start/stop pairs are not employed, there can be a stack associated with bytes allocated. In this case, it can be determined or inferred that the bytes allocated are attributable to group "A." Therefore, stacks in combination with additional data allow a system to work back to the same event start/stop pair grouping. In another scenario, where solely sample stacks are employed time to execute sampling can be employed. Here, the information able to be revealed is the approximate time spent executing in a logical group or the like. In other words, the samples themselves are logically grouped.

It is to be appreciated that grouping information need not be limited to that which is expressed in an organizational scheme to organize profile data. By way of example, consider a data stream that interleaves grouping start/stop event pairs with another event of interest such as bytes allocated. In this case, the grouping start/stop event pairs can be utilized as a basis for grouping the bytes allocated event. In other words, bytes allocated can be ascribed to a group associated with the event start/stop pairs. Of course, stack-grouping information expressed in an organizational scheme can be utilized and applied to a callback associated with an event payload, for instance.

Figure 7:
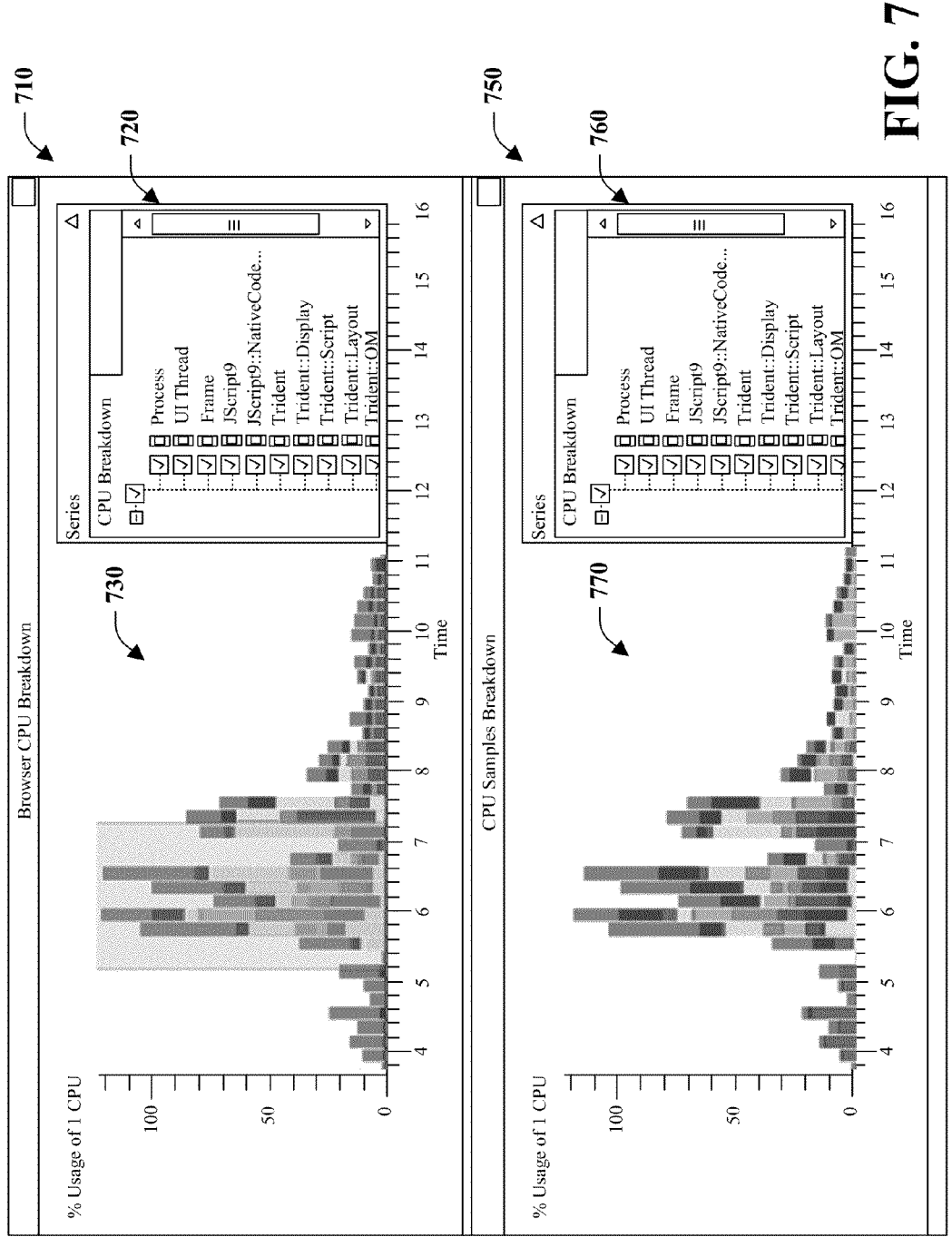
FIG. 7 is an exemplary screenshot of graph visualization of profile data.

FIGS. 6 and 7 are exemplary screenshots of visualization of profile data associated with a web browser. Further, the visualization can be produced as a function of an organizational scheme such as the one provided in APPENDIX A. Here, the organizational scheme is encoded as an XML document in which tags identify groups and the structure defines hierarchical relationships between groups. FIGS. 6 and 7 are provided to facilitate clarity and understanding with respect to aspects of this disclosure and not to limit the scope of the appended claims thereto. One of skill in the art will recognize upon reading this description that there are various other manners of visualizing grouped profile data all of which are within the spirit and scope of this disclosure.

FIG. 6 is an exemplary screenshot of a table visualization of profile data. More specifically, the screenshot depicts a detailed central processor unit (CPU) utilization breakdown by subsystem as defined by an organizational scheme. The table specifies groups and subgroups with respect to a plurality of rows and columns. Column 610, labeled "Process," specifies the root of a hierarchy of groups corresponding to the single binary or executable. Column 615 provides a grouping by thread identifiers. For each thread identifier there are three levels of sub-groups as denoted by columns 620, 625, and 630. For instance, column 620 identifies a browser-rendering engine, named "Trident," which is broken down into "Layout," and "Display," among other things noted in column 625. Further, "Layout," in column 625, is further broken down into "BuildBlocks" and "BuildLayout" groups, among others noted in column 630. Profile data is noted and aggregated for each group and sub-group and is provided in columns 635, 640, 645, 650, 660, and 665 corresponding respectively to start time, end time, duration, percentage of CPU utilization, percentage of time and count. From this table, high-level meaningful information is communicated. From a quick glance, a user can determine that the browser is spending too much time in layout and thus optimization efforts can focus on portions of the program dealing with the layout.

FIG. 7 is an exemplary screenshot showing CPU utilization breakdown of execution by subsystem, as defined by the organizational scheme specified in Appendix A. Two views, 710 and 750, are shown to enable comparison of two collection mechanisms instrumentation (e.g., start/stop pairs) and sampling (e.g., stack samples. Each of view 710 and view 750 include respective bar graphs 730 and 770 plotting percentage usage of a single central processing unit over time. Further, each graph distinguishes groups, which selectable by way of checkboxes in windows 720 and 760.

The aforementioned systems, architectures, environments, and the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component to provide aggregate functionality. Communication between systems, components and/or sub-components can be accomplished in accordance with either a push and/or pull model. The components may also interact with one or more other components not specifically described herein for the sake of brevity, but known by those of skill in the art.

Furthermore, various portions of the disclosed systems above and methods below can include or employ of artificial intelligence, machine learning, or knowledge or rule-based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. By way of example, and not limitation, the scheme generation component 130 can utilize such mechanism to infer groups based on available information.

Figure 8:
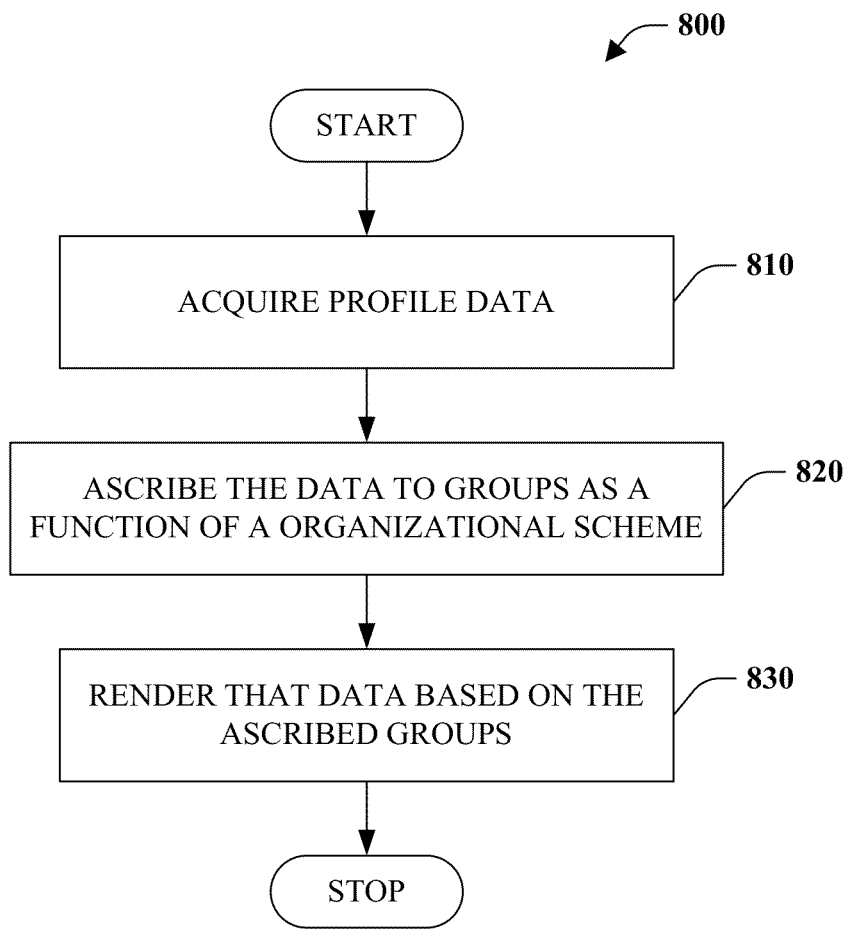
FIG. 8 is a flow chart diagram of a method of program profiling.
Figure 9:
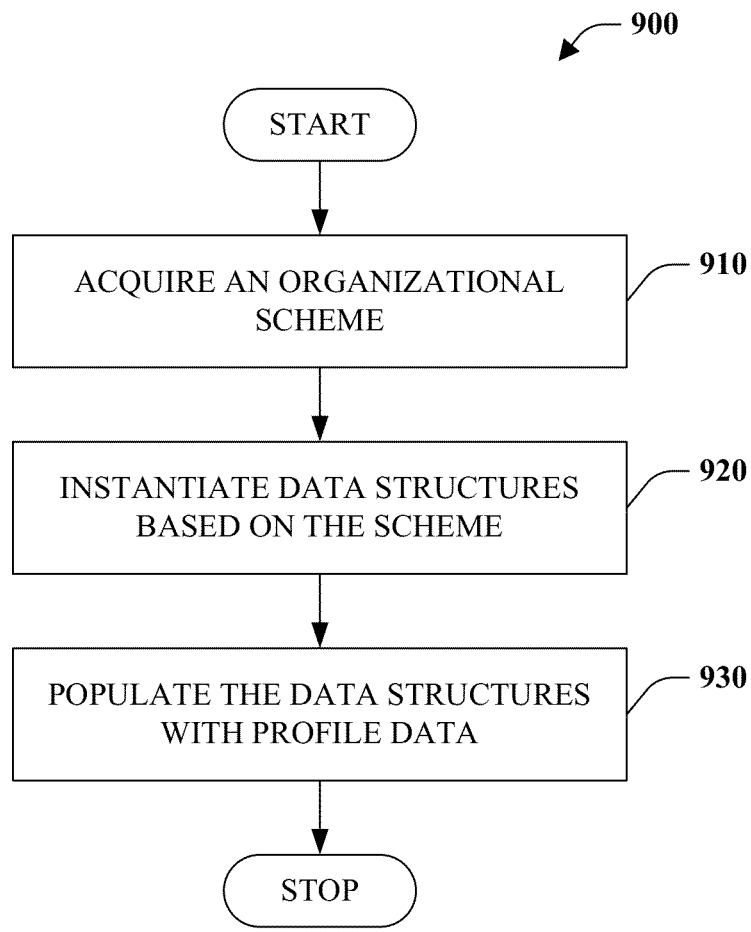
FIG. 9 is a flow chart diagram of a method of grouping profiling data.

In view of the exemplary systems described supra, methodologies that may be implemented in accordance with the disclosed subject matter will be better appreciated with reference to the flow charts of FIGS. 8 and 9. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

Referring to FIG. 8, a method of program profiling 800 is illustrated. At reference numeral 810, profile data can be acquired. In one instance, such data can be acquired by way code instrumentation, sampling, or both. Alternatively, historical profile data can be received, retrieved, or otherwise obtained or acquired from a log or other persisted file, for example. At numeral 820, profile data can be ascribed to groups as a function of an organizational scheme that defines groups and relationships between groups. In other words, the organizational scheme can be overlaid on the profile data. Further, the groupings can be associated with high-level functions of a program or a sub-system of the program such that a group is an abstraction that is meaningful for program analysis. As an example, execution time and central processor utilization associated with a first set of functions responsible for layout of content in a browser window can be ascribed to group "A" while the same data associated with a second set of functions that displays the browser window can be ascribed to group "B." Further and in accordance with one embodiment, profile data associated with a context switch is excluded. At reference numeral 830, data can be rendered based on the ascribed groups to visualize grouped data and aid diagnosing performance issues. In other words, the profile data can be rendered in terms of groups ascribed thereto. In one instance, grouped data can be housed in a data store that can be queried to retrieve requisite data for a visualization. Further, the visualization can be embodied as a graphical user interface that can enable human users to issue or modify queries as well as influence the manner in which data resulting from such queries is presented. For example, such queries can enable zooming in and out with respect to a timeline. Further, alternate organizational schemes may be applied to the data to further aid analysis.

FIG. 9 is a flow chart diagram depicting a method of grouping profile data. At reference numeral 910, an organizational scheme is received, retrieved, or otherwise obtained or acquired. The organizational scheme can specify groups and relationships between groups. In one instance, the organizational scheme can be manually authored optionally utilizing pattern matching or other filtering mechanisms (e.g., regular expressions, use of wild-card characters . . . ) to aid specification. Additionally or alternatively, the organizational scheme can be generated automatically or semi-automatically based on context or other available information. At numeral 920, data structures can be created, or instantiated based on the scheme. For instance, structures can be created for each defined group. A reference numeral 930, the created data structures can be populated with profile data, for instance as it is received. In this manner, profiling data can be ascribed to a group. Subsequently, the grouped data can be queried or saved for later use.

The word "exemplary" or various forms thereof are used herein to mean serving as an example, instance, or illustration. Any aspect or design described herein as "exemplary" is not necessarily to be construed as preferred or advantageous over other aspects or designs. Furthermore, examples are provided solely for purposes of clarity and understanding and are not meant to limit or restrict the claimed subject matter or relevant portions of this disclosure in any manner. It is to be appreciated a myriad of additional or alternate examples of varying scope could have been presented, but have been omitted for purposes of brevity.

As used herein, the terms "component," and "system," as well as various forms thereof (e.g., components, systems, sub-systems . . . ) are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The conjunction "or" as used this description and appended claims in is intended to mean an inclusive "or" rather than an exclusive "or," unless otherwise specified or clear from context. In other words, "'X' or 'Y'" is intended to mean any inclusive permutations of "X" and "Y." For example, if "'A' employs 'X,'" "'A employs 'Y,'" or "'A' employs both 'X' and 'Y,'" then "'A' employs 'X' or 'Y'" is satisfied under any of the foregoing instances.

As used herein, the term "inference" or "infer" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

Figure 10:
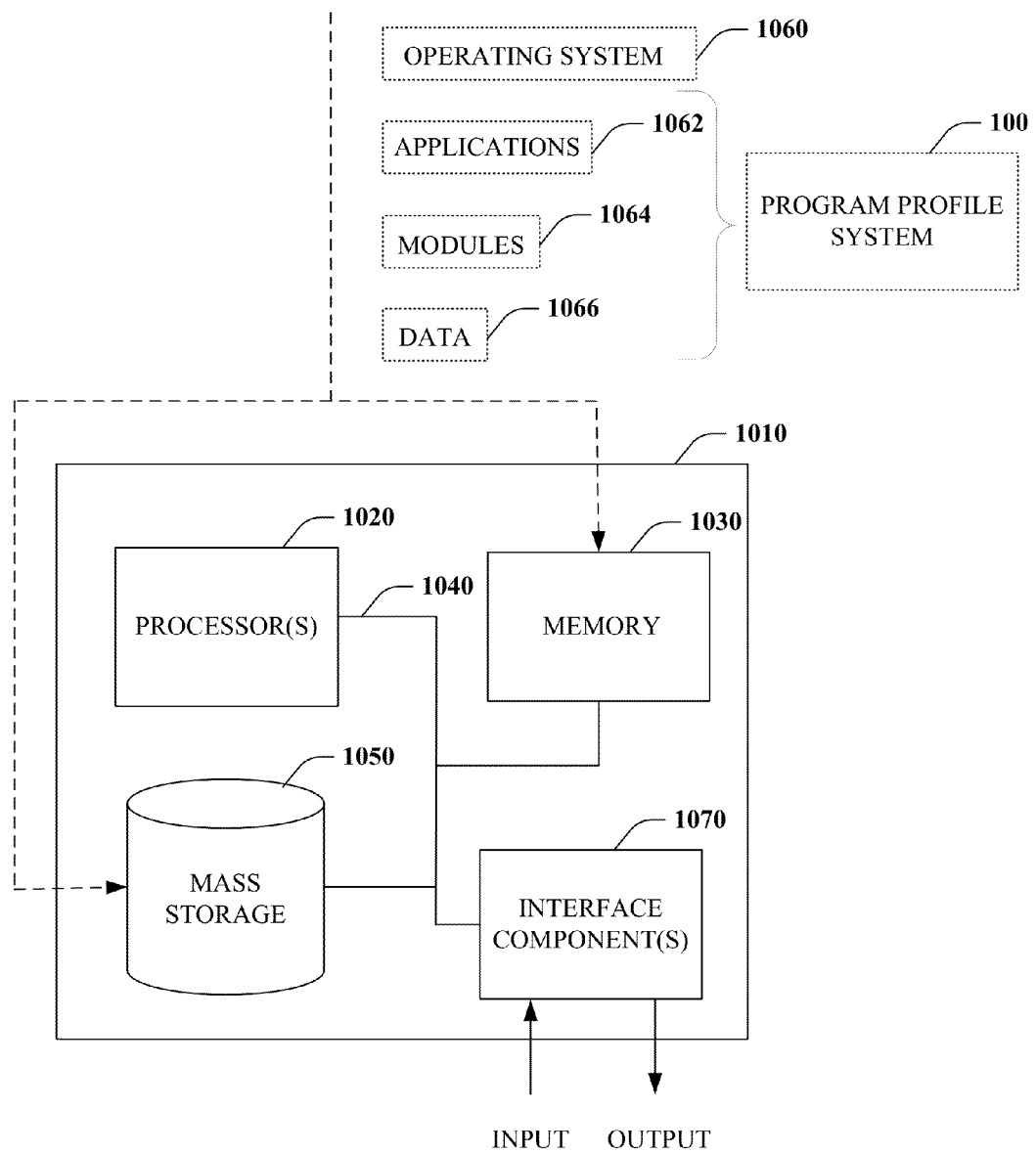
FIG. 10 is a schematic block diagram illustrating a suitable operating environment for aspects of the subject disclosure.

In order to provide a context for the claimed subject matter, FIG. 10 as well as the following discussion are intended to provide a brief, general description of a suitable environment in which various aspects of the subject matter can be implemented. The suitable environment, however, is only an example and is not intended to suggest any limitation as to scope of use or functionality.

While the above disclosed system and methods can be described in the general context of computer-executable instructions of a program that runs on one or more computers, those skilled in the art will recognize that aspects can also be implemented in combination with other program modules or the like. Generally, program modules include routines, programs, components, data structures, among other things that perform particular tasks and/or implement particular abstract data types. Moreover, those skilled in the art will appreciate that the above systems and methods can be practiced with various computer system configurations, including single-processor, multi-processor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. Aspects can also be practiced in distributed computing environments where tasks are performed by remote processing devices that are linked through a communications network. However, some, if not all aspects of the claimed subject matter can be practiced on stand-alone computers. In a distributed computing environment, program modules may be located in one or both of local and remote memory storage devices.

With reference to FIG. 10, illustrated is an example general-purpose computer 1010 or computing device (e.g., desktop, laptop, server, hand-held, programmable consumer or industrial electronics, set-top box, game system . . . ). The computer 1010 includes one or more processor(s) 1020, memory 1030, system bus 940, mass storage 1050, and one or more interface components 1070. The system bus 1040 communicatively couples at least the above system components. However, it is to be appreciated that in its simplest form the computer 1010 can include one or more processors 1020 coupled to memory 1030 that execute various computer executable actions, instructions, and or components stored in memory 1030.

The processor(s) 1020 can be implemented with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 1020 may also be implemented as a combination of computing devices, for example a combination of a DSP and a microprocessor, a plurality of microprocessors, multi-core processors, one or more microprocessors in conjunction with a DSP core, or any other such configuration.

The computer 1010 can include or otherwise interact with a variety of computer-readable media to facilitate control of the computer 1010 to implement one or more aspects of the claimed subject matter. The computer-readable media can be any available media that can be accessed by the computer 1010 and includes volatile and nonvolatile media, and removable and non-removable media. By way of example, and not limitation, computer-readable media may comprise computer storage media and communication media.

Computer storage media includes volatile and nonvolatile, removable and non-removable media implemented in any method or technology for storage of information such as computer-readable instructions, data structures, program modules, or other data. Computer storage media includes, but is not limited to memory devices (e.g., random access memory (RAM), read-only memory (ROM), electrically erasable programmable read-only memory (EEPROM) . . . ), magnetic storage devices (e.g., hard disk, floppy disk, cassettes, tape . . . ), optical disks (e.g., compact disk (CD), digital versatile disk (DVD) . . . ), and solid state devices (e.g., solid state drive (SSD), flash memory drive (e.g., card, stick, key drive . . . ) . . . ), or any other medium which can be used to store the desired information and which can be accessed by the computer 1010.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1030 and mass storage 1050 are examples of computer-readable storage media. Depending on the exact configuration and type of computing device, memory 1030 may be volatile (e.g., RAM), non-volatile (e.g., ROM, flash memory . . . ) or some combination of the two. By way of example, the basic input/output system (BIOS), including basic routines to transfer information between elements within the computer 1010, such as during start-up, can be stored in nonvolatile memory, while volatile memory can act as external cache memory to facilitate processing by the processor(s) 1020, among other things.

Mass storage 1050 includes removable/non-removable, volatile/non-volatile computer storage media for storage of large amounts of data relative to the memory 1030. For example, mass storage 1050 includes, but is not limited to, one or more devices such as a magnetic or optical disk drive, floppy disk drive, flash memory, solid-state drive, or memory stick.

Memory 1030 and mass storage 1050 can include, or have stored therein, operating system 1060, one or more applications 1062, one or more program modules 1064, and data 1066. The operating system 1060 acts to control and allocate resources of the computer 1010. Applications 1062 include one or both of system and application software and can exploit management of resources by the operating system 1060 through program modules 1064 and data 1066 stored in memory 1030 and/or mass storage 1050 to perform one or more actions. Accordingly, applications 1062 can turn a general-purpose computer 1010 into a specialized machine in accordance with the logic provided thereby.

All or portions of the claimed subject matter can be implemented using standard programming and/or engineering techniques to produce software, firmware, hardware, or any combination thereof to control a computer to realize the disclosed functionality. By way of example and not limitation, the program profile system 100, or portions thereof, can be, or form part, of an application 1062, and include one or more modules 1064 and data 1066 stored in memory and/or mass storage 1050 whose functionality can be realized when executed by one or more processor(s) 1020.

In accordance with one particular embodiment, the processor(s) 1020 can correspond to a system on a chip (SOC) or like architecture including, or in other words integrating, both hardware and software on a single integrated circuit substrate. Here, the processor(s) 1020 can include one or more processors as well as memory at least similar to processor(s) 1020 and memory 1030, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the program profile system 100 and/or associated functionality can be embedded within hardware in a SOC architecture.

The computer 1010 also includes one or more interface components 1070 that are communicatively coupled to the system bus 1040 and facilitate interaction with the computer 1010. By way of example, the interface component 1070 can be a port (e.g., serial, parallel, PCMCIA, USB, Fire Wire . . . ) or an interface card (e.g., sound, video . . . ) or the like. In one example implementation, the interface component 1070 can be embodied as a user input/output interface to enable a user to enter commands and information into the computer 1010 through one or more input devices (e.g., pointing device such as a mouse, trackball, stylus, touch pad, keyboard, microphone, joystick, game pad, satellite dish, scanner, camera, other computer . . . ). For instance, an input device can capture user gestures or voice commands. In another example implementation, the interface component 1070 can be embodied as an output peripheral interface to supply output to displays (e.g., CRT, LCD, plasma . . . ), speakers, printers, and/or other computers, among other things. Still further yet, the interface component 1070 can be embodied as a network interface to enable communication with other computing devices (not shown), such as over a wired or wireless communications link.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims.

APPENDIX A

```xml
<?xml version="1.0" encoding="utf-8"?>
<TagSet Name="IE">
  <ETWNames>
    <Provider Name="Microsoft-IE" Guid="123"/>
    <Provider Name="Microsoft-IEFRAME" Guid="456"/>
    <Symbol Name="win:Start" Value="1"/>
    <Symbol Name="win:Stop" Value="2"/>
  </ETWNames>
  <Tag Name="IEFrame" Graph="1">
    <Tag Name="AsyncWork">
      <Entrypoint Module="ieframe.dll"
        Method="CAsyncStorage::s_WorkItemCallback"/>
      <Entrypoint Module="ieframe.dll"
        Method="LowFrequencyWorkitemThreadProc"/>
      <Entrypoint Module="ieframe.dll"
        Method="LowFrequencyWorkitemWndProc"/>
      <Entrypoint Module="ieframe.dll"
        Method="QueueLowFrequencyWorkitem"/>
      <Entrypoint Module="ieframe.dll"
        Method="WinList_AsyncWorkitemThreadProc"/>
    </Tag>
    <Tag Name="NavBar">
      <Entrypoint Module="ieframe.dll"
        Method="CNavBar::_CreateBar"/>
      <Entrypoint Module="ieframe.dll"
        Method="CNavBar::OnFocusChangeIS"/>
      <Tag Name="Address">
        <Entrypoint Module="ieframe.dll"
          Method="CAddressBand::s_AddressBandWndProc"/>
        <Entrypoint Module="ieframe.dll"
          Method="CAddressBand::OnFocusChangeIS"/>
      </Tag>
    </Tag>
    <Tag Name="NewTabPage">
      <Entrypoint Module="ieframe.dll"
        Method="CShellUIHelper::BuildNewTabPage"/>
      <Tag Name="Activities">
        <Entrypoint Module="ieframe.dll"
          Method="CNewTabPageActivitiesFactory::
          BuildActivitiesList"/>
      </Tag>
      <Tag Name="ClosedTabs">
        <Entrypoint Module="ieframe.dll"
          Method="CNewTabPageClosedTabsFactory::
          BuildRecentlyClosedTabsList"/>
      </Tag>
    </Tag>
    <Tag Name="StatusBar">
      <Entrypoint Module="ieframe.dll"
        Method="CShellBrowser2::s_StatusBarSubclassWndProc"/>
      <Entrypoint Module="ieframe.dll"
        Method="CDocObjectHost::_ResetStatusBar"/>
    </Tag>
    <Tag Name="TabManagement">
      <Entrypoint Module="ieframe.dll"
        Method="CTabWindowManager::AddBlankTab"/>
      <Entrypoint Module="ieframe.dll"
        Method="CTabWindowManager::HandleTabBrowserCreated"/>
    </Tag>
    <Tag Name="Taskbar">
      <Entrypoint Module="ieframe.dll"
        Method="CTaskbarBroker::UpdateLiveClipRect"/>
      <Entrypoint Module="ieframe.dll"
        Method="CTaskbarBroker::OnTabCreated"/>
      <Entrypoint Module="ieframe.dll"
        Method="CTaskbarBroker::OnTabSelectionChanged"/>
      <Entrypoint Module="ieframe.dll"
        Method="CTaskbarBroker::OnTabStateChanged"/>
      <Entrypoint Module="ieframe.dll"
        Method="CTaskbarBroker::CreateInstance"/>
    </Tag>
    <Tag Name="Thumbnails">
      <Entrypoint Module="ieframe.dll"
        Method="CTabThumbnailHandler::v_WndProc"/>
      <Entrypoint Module="ieframe.dll"
        Method="CTabImageCache::ShouldCatchUpThumbnails"/>
      <Entrypoint Module="ieframe.dll"
        Method="CTabThumbnailHandler::SetTitle"/>
      <Entrypoint Module="ieframe.dll"
        Method="CTabThumbnailHandler::CreateInstance"/>
    </Tag>
    <Tag Name="Networking">
      <Entrypoint Module="ieframe.dll"
        Method="FramePreCacheStartup"/>
      <Entrypoint Module="ieframe.dll"
        Method="StartAutoProxyDetection"/>
      <Entrypoint Module="ieframe.dll"
        Method="SetProtectedModeFolders"/>
      <Entrypoint Module="wininet.dll"
        Method="GetUrlCacheEntryInfoW"/>
      <Entrypoint Module="ieframe.dll"
        Method="CDocObjectHost::_StartAsyncBinding"/>
    </Tag>
    <Tag Name="NewTabPage">
      <Entrypoint Module="ieframe.dll"
        Method="CBrowserFrame::ShowNewTabPage"/>
    </Tag>
    <Tag Name="PlaySound">
      <Entrypoint Module="ieframe.dll" Method="SHPlaySound"/>
      <Module Name="winmm.dll"/>
      <Module Name="wdmaud.drv"/>
    </Tag>
    <Tag Name="LowFreqWorkerThread">
      <Entrypoint Module="ieframe.dll"
        Method="LowFrequencyWorkitemThreadProc"/>
    </Tag>
    <Tag Name="WSQuery">
      <Entrypoint Module="ieframe.dll"
        Method="CWSProvider::Query"/>
      <Entrypoint Module="ieframe.dll"
        Method="CQueryWorker::ProcessQuery"/>
      <Entrypoint Module="ieframe.dll"
        Method="CDataModel::Query"/>
      <Entrypoint Module="ieframe.dll"
        Method="CWSDataItem::GetMatches"/>
    </Tag>
    <Tag Name="ULV">
      <Entrypoint Module="ieframe.dll"
        Method="CUnifiedListViewHost::OnEditContentChanged"/>
      <Entrypoint Module="ieframe.dll"
        Method="CULVWindow::_LoadDUI"/>
      <Entrypoint Module="ieframe.dll"
        Method="CULVWindow::UpdateGroup"/>
      <Entrypoint Module="ieframe.dll"
        Method="CULVWindow::SetCustomUI"/>
    </Tag>
    <Tag Name="SFToolbar">
      <Entrypoint Module="ieframe.dll"
        Method="CSFToolbar::_DefWindowProc"/>
    </Tag>
    <Tag Name="History">
      <ETWStart Provider="Microsoft-IEFRAME" Id="0x2c"
        Version="0x0" Task="0x1d" Opcode="win:Start"
        Symbol="ADDTOHISTORY_START"/>
      <ETWStop Provider="Microsoft-IEFRAME" Id="0x2d"
        Version="0x0" Task="0x1d" Opcode="win:Stop"
        Symbol="ADDTOHISTORY_STOP"/>
    </Tag>
  </Tag>
  <Tag Name="System">
    <Tag Name="DPC+ISRs">
      <Entrypoint Module="ntkrnlpa.exe"
        Method="KiRetireDpcList"/>
      <Entrypoint Module="ntkrnlpa.exe"
        Method="KiInterruptDispatch"/>
      <Entrypoint Module="ntkrnlpa.exe"
        Method="KiIpiServiceRoutine"/>
      <Entrypoint Module="halmacpi.dll"
        Method="HalpIpiHandler"/>
    </Tag>
    <Tag Name="ETWStackWalking">
      <Entrypoint Module="ntkrnlpa.exe"
        Method="EtwpStackWalkApc"/>
      <Entrypoint Module="ntkrnlpa.exe"
        Method="EtwpStackTraceDispatcher"/>
    </Tag>
    <Tag Name="ThreadPool">
      <Entrypoint Module="ntdll.dll"
        Method="TppWorkerThread"/>
      <Entrypoint Module="ntdll.dll" Method="TpAllocPool"/>
```

APPENDIX A-continued

```
        </Tag>
        <Tag Name="ETW">
            <Entrypoint Module="ntdll.dll" Method="EtwEventWrite"/>
        </Tag>
    </Tag>
<Tag Name="Trident" Graph="1"><Tag Name="Script" Graph="1">
    <Entrypoint Module="mshtml.dll"
        Method="CScriptElement::CommitCode"/>
    <Entrypoint Module="mshtml.dll"
        Method="CScriptElement::Execute"/>
    <Entrypoint Module="mshtml.dll"
        Method="CWindow::ExecuteTimeoutScript"/>
</Tag>
<Tag Name="Layout" Graph="1">
    <ETWStart Provider="Microsoft-IE" Id="0x03"
        Version="0x0" Task="0x02" Opcode="win:Start"
        Symbol="MSHTML_CMARKUP_LAYOUT_START"/>
    <ETWStop Provider="Microsoft-IE" Id="0x04"
        Version="0x0" Task="0x02" Opcode="win:Stop"
        Symbol="MSHTML_CMARKUP_LAYOUT_STOP"/>
    <Entrypoint Module="mshtml.dll"
        Method="CView::EnsureView"/>
    <Entrypoint Module="mshtml.dll"
        Method="CDisplay::RecalcView"/>
    <Entrypoint Module="mshtml.dll"
        Method="CElement::EnsureRecalcNotify"/>
    <Entrypoint Module="mshtml.dll"
        Method="CLayout::DoLayout"/>
    <Entrypoint Module="mshtml.dll"
        Method="CRecalcTask::OnRun"/>
    <Tag Name="BuildBlocks">
        <ETWStart Provider="Microsoft-IE" Id="0x9f"
            Version="0x0" Task="0x6e" Opcode="win:Start"
            Symbol="MSHTML_CSSLAYOUT_BUILDBLOCKS_
            START"/>
        <ETWStop Provider="Microsoft-IE" Id="0xa0"
            Version="0x0" Task="0x6e" Opcode="win:Stop"
            Symbol="MSHTML_CSSLAYOUT_BUILDBLOCKS_
            STOP"/>
        <Entrypoint Module="mshtml.dll"
            Method="CLayoutBlock::BuildBlock"/>
    </Tag>
    <Tag Name="BuildLayout">
        <ETWStart Provider="Microsoft-IE" Id="0xa1"
            Version="0x0" Task="0x6f" Opcode="win:Start"
            Symbol="MSHTML_CSSLAYOUT_BUILDLAYOUT_
            START"/>
        <ETWStop Provider="Microsoft-IE" Id="0xa2"
            Version="0x0" Task="0x6f" Opcode="win:Stop"
            Symbol="MSHTML_CSSLAYOUT_BUILDLAYOUT_
            STOP"/>
        <Entrypoint Module="mshtml.dll"
            Method="Ptls5::FsUpdateBottomlessPage"/>
        <Entrypoint Module="mshtml.dll"
            Method="Ptls5::FsUpdateBottomlessPageWithHint"/>
        <Entrypoint Module="mshtml.dll"
            Method="Ptls5::FsUpdateFinitePage"/>
        <Entrypoint Module="mshtml.dll"
            Method="Ptls5::FsCreatePageFinite"/>
        <Entrypoint Module="mshtml.dll"
            Method="Ptls5::FsCreatePageBottomless"/>
    </Tag>
    <Tag Name="BuildDisplay">
        <ETWStart Provider="Microsoft-IE" Id="0xa3"
            Version="0x0" Task="0x70" Opcode="win:Start"
            Symbol="MSHTML_CSSLAYOUT_BUILDDISPLAY_
            START"/>
        <ETWStop Provider="Microsoft-IE" Id="0xa4"
            Version="0x0" Task="0x70" Opcode="win:Stop"
            Symbol="MSHTML_CSSLAYOUT_BUILDDISPLAY_
            STOP"/>
        <Entrypoint Module="mshtml.dll"
            Method="CPtsPage::SetupDisplayBoxForPage"/>
        <Entrypoint Module="mshtml.dll"
            Method="CCssPageLayout::SetupDisplayBoxForPage"/>
        <Entrypoint Module="mshtml.dll"
            Method="CView::CloseDisplayTree"/>
    </Tag>
    <Tag Name="PTLS" Priority="-1">
        <Namespace Module="mshtml.dll" Method="Ptls5::"/>
    </Tag>
</Tag></TagSet>
```

What is claimed is:

1. A method of profiling a computer program, comprising:
employing at least one processor configured to execute computer-executable instructions stored in a memory to perform the following acts:
receiving organizational scheme specified external to a profile system and target program and configured to define arbitrary groups and relationships between the groups, wherein the groups are abstractions that correspond to high-level program functionality;
receiving profile data collected during execution of a program; and
ascribing the profile data to logical groups based on the organizational scheme.

2. The method of claim 1 further comprises aggregating profile data of a group.

3. The method of claim 1 further comprises suspending the act of ascribing the profile data to the logical groups during a context switch event.

4. The method of claim 1 further comprises collecting the profile data by way of sampling and instrumentation.

5. The method of claim 1 further comprises ascribing the profile data to the groups based on relative priorities of candidate groups for the profile data.

6. The method of claim 1 further comprises returning at least a subset of the profiling data in response to a query.

7. The method of claim 1 further comprises delivering the profile data and the groups ascribed thereto to one or more subscribers to grouped data.

8. The method of claim 1 further comprises automatically generating at least a portion of the organizational scheme.

9. A program profile system, comprising:
a processor coupled to a memory, the processor configured to execute the following computer-executable components stored in the memory:
a first component configured to ascribe profile data to groups as a function of an organizational scheme specified external to a profile system and target program and configured to define arbitrary groups and relationships between the groups, wherein the groups are abstractions that correspond to a high-level view of computer program functionality.

10. The system of claim 9 further comprises a second component configured to acquire the profiling data with a combination of instrumentation and sampling.

11. The system of claim 9, the organizational scheme specifies a group in terms of a set of one or more stacks.

12. The system of claim 9, the organizational scheme specifies a group in terms of a set of one or more start/stop event pairs.

13. The system of claim 9 further comprises a second component configured to process a query against the profile data.

14. The system of claim 9 further comprises a second component configured to update at least a portion of the organizational scheme automatically.

15. A computer storage medium having instructions stored thereon that enable at least one processor to perform a method upon execution, the method comprising:
receiving organizational scheme specified external to a profile system and target program and configured to define arbitrary groups and relationships between the groups, wherein the groups are abstractions that correspond to high-level program functionality;

receiving profile data collected during execution of a computer program; and grouping the profile data in accordance with the organizational scheme.

16. The computer storage medium of claim 15, the method further comprises processing queries over grouped data.

17. The computer storage medium of claim 15, the method further comprises delivering grouped profile data to one or more subscribers.

18. The computer storage medium of claim 15, the method further comprises acquiring the profiling data by way of a combination of program sampling and instrumentation.

19. The system of claim 9, the groups further capture identity of a program within a broader system.

20. The system of claim 9, the groups further capture identities of an individual or group responsible for program code.

\* \* \* \* \*